Figure 1:
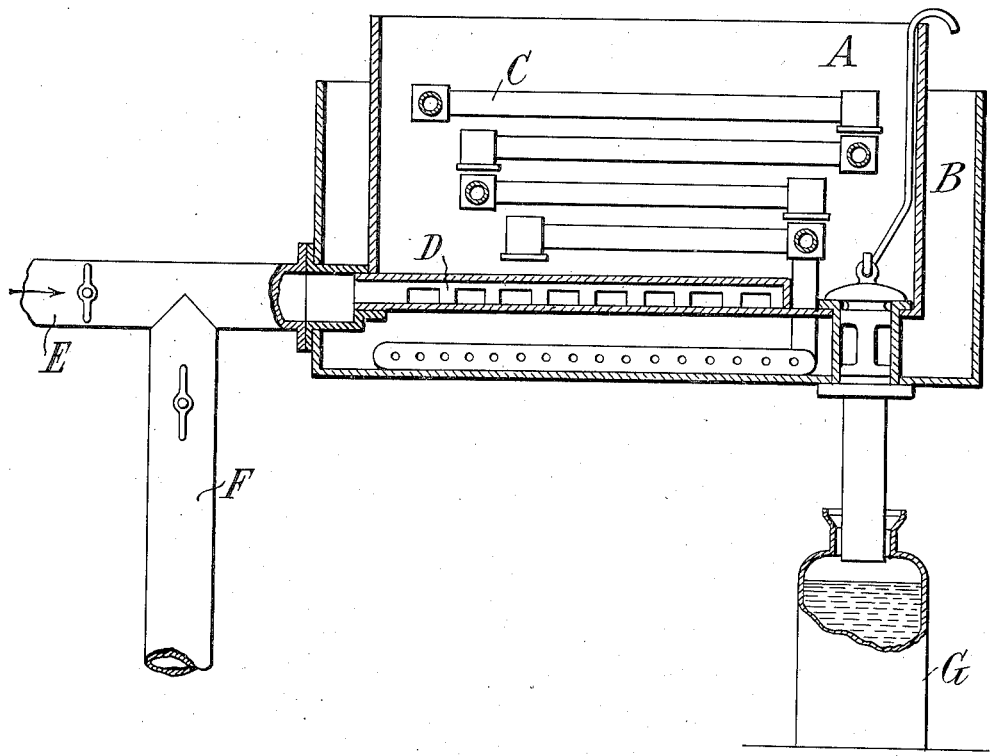

C. H. & P. T. CAMPBELL.
MILK PRODUCT AND PROCESS.
APPLICATION FILED JAN. 2, 1906.

1,016,548.

Patented Feb. 6, 1912.

WITNESSES:
Fred White
Rene Bruine

INVENTORS:
Charles H. Campbell,
and Pearl T. Campbell,
By Attorneys,
Arthur C. Fraser & Co.

UNITED STATES PATENT OFFICE.

CHARLES H. CAMPBELL, OF NEW YORK, N. Y., AND PEARL T. CAMPBELL, OF HACKENSACK, NEW JERSEY.

MILK PRODUCT AND PROCESS.

1,016,548. Specification of Letters Patent. Patented Feb. 6, 1912.

Application filed January 2, 1906. Serial No. 294,174.

*To all whom it may concern:*

Be it known that we, CHARLES H. CAMPBELL and PEARL T. CAMPBELL, citizens of the United States, residing, respectively, in the borough of Manhattan, city, county, and State of New York, and in Hackensack, Bergen county, New Jersey, have jointly invented certain new and useful Improvements in Milk Products and Processes, of which the following is a specification.

Our invention aims to provide a new food product comprising a mixture of milk solids with a reduced proportion of the sugar relatively to the other solids of the milk. Preferably also the fatty solids are largely eliminated. Preferably also the product with or without the fatty solids is deprived of a considerable quantity of water of the original milk so as to have approximately the consistency of cream. The product is of high protein value and is free from the sweet taste which characterizes most concentrated milk products. Where it includes also the cream or fatty solids of the milk, the removal of the sugar gives to the final product the taste of unsweetened cream and the product has at the same time, a more nutritious and flesh-forming quality than pure cream. Its proportion of fats being less than in pure cream is an advantage in making it edible in the case of persons who reject pure cream on account of its extreme fatness and makes it edible also in greater quantity than is pure fat cream.

The product is obtained by concentrating the milk and separating out a portion of the sugar. The presence of fat in the milk interferes with the separation of sugar and therefore we prefer to remove all or a large portion of the cream, the quantity removed depending largely upon the ease of removal. By first separating the cream and then adding it after the separation of the sugar, such separation of the sugar is greatly facilitated and the cream is retained in its original condition.

The separation of the sugar is preferably performed by cooling or chilling it to a temperature at which it is more than saturated with sugar, whereupon a portion of the sugar is precipitated and may be separated by decanting or by a filter press or centrifugal machine. The extent of the cooling or chilling operation depends upon the degree of concentration of the milk. We prefer to concentrate the milk to about one-fourth its original volume. In this condition it is more than saturated with sugar so that upon cooling to ordinary atmospheric temperature, a portion of the sugar may be removed. Preferably, however, it is chilled somewhat below atmospheric temperature so as to increase the precipitation of sugar. Preferably the milk is concentrated by a process which includes the application of heat. Thus while still carrying all its sugar in solution, it may be concentrated to a high degree. The temperature applied is preferably below the point of coagulation of albumen so as to preserve the proteids in soluble and peptogenic condition.

After the first removal of sugar, the product may be further concentrated and an additional quantity of sugar precipitated and separated out. Under the conditions stated we have found that a very large percentage of the sugar can be removed after the first concentration, roughly estimated, about 75% of the total sugar in the milk.

This process obtains in a very simple and cheap manner the new product above described but also obtains as a valuable by-product a substantial quantity of milk sugar.

We have found also that the appearance of the product may be improved by heating it, preferably after the extraction of the sugar, to a point above the coagulating point of albumen and holding it there for a few minutes. This results in stiffening and whitening the mass without substantially affecting its taste. In this operation care must be taken to avoid too high a temperature. Below about 140 degrees, at which coagulation of albumen commences, there is no stiffening noticeable. Immediately above about 160 degrees, which is the temperature of substantially complete coagulation, this stiffening is very rapid. Between this temperature and about 210 degrees the stiffening varies somewhat with the temperature and the length of time. At or above 210 degrees a boiled flavor results in the product; and it is desirable, therefore, to maintain the temperature considerably below this point.

The concentrating process may be carried out in any known or suitable way as for example, in the manner explained in the patent of Jos. H. Campbell, No. 688,161 of Feb. 19, 1901.

The accompanying drawings illustrate more or less diagrammatically a complete process embodying the invention.

Figure 2:
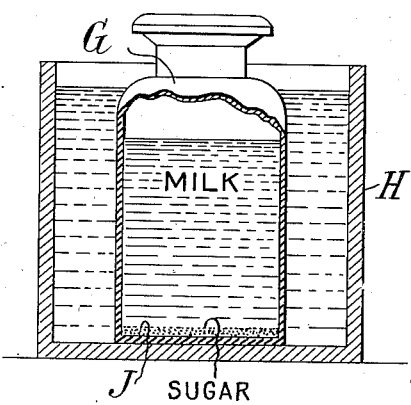

Figure 1 is a section of a concentrating tank and a can into which the product is conveyed from the tank; Fig. 2 is a section of a can containing the concentrated milk in a cooling bath.

Referring to the drawings, the milk is placed in a concentrating tank A surrounded by a hot water jacket B and provided with internal coils C through which hot water is circulated. At the same time air is blown in and through the milk by way of an air pipe D. Hot air may be used if desired or cold air, separate air pipes E and F being provided for the hot and cold air respectively. The milk after being reduced to the desired degree of concentration is drawn off into any suitable vessel such for example, as the milk can G. The milk can is then placed in the vessel H containing ice water or cold water or any other cooling mixture. The sugar separates and forms a layer as indicated at J in the bottom of the can. When as much sugar as possible is collected on the bottom of the can, the milk is poured off into another receptacle. It may be poured back into the concentrating tank A and again concentrated and deprived of a portion of its sugar. The material may be further concentrated to a point of complete desiccation by any suitable process of which there are several known, such for example as the processes described in patents to Joseph H. Campbell, No. 668,159 or of Joseph H. Campbell and Charles H. Campbell, No. 668,162, and the desiccated product may be obtained in the form of a powder or flour or in the form of flakes or granules, and may be either substantially free from cream or contain any suitable percentage of cream, and the broad claims to the product and process hereinafter are to be understood as relating to such product.

While a large percentage of the sugar is thrown down when the concentrated milk is chilled, yet there is a considerable quantity of finely crystallized sugar throughout the body of the milk which is quite perceptible to feeling and taste, and in process of decanting off the milk, only that sugar which had been thrown down to the bottom of the vessel would be separated. On account of the heavy body of the concentrated milk there would be a considerable volume of light crystals of sugar remaining in suspension. A higher percentage of sugar may be separated by positive mechanical separators, the heavier sugar passing out of the skim milk tube and the concentrated milk freed of the sugar out of the cream tube.

All the sugar in the mass may be more effectively separated by a filter press as above described, or by passing down through the milk a septum composed of one or more layers of cloth, such for example as cheesecloth, between which coarse sand may be arranged. By forcing this septum down through the body of the liquid slowly it strains out and carries down with it the finer particles of sugar.

An important advantage of our invention is that the product produced by our process, and in which the proportion of milk sugar is sufficiently diminished, is found to have markedly superior keeping qualities as compared with ordinary condensed milk of similar consistency. In the case of concentrated skimmed milk from part of which only the sugar was crystallized out and removed as herein described, it was found that the portion from which a large proportion of sugar had been removed, remained perfectly sweet, for more than ten days, while the portion from which no sugar had been removed, became offensively sour in three days, both being exposed to essentially like temperature conditions.

Though we have described with great particularity of detail certain specific embodiments of our invention, it is not to be understood therefrom that the invention is limited to the specific embodiments disclosed. Various modifications may be made by those skilled in the art without departure from our invention.

What we claim is:—

1. The process of treating milk to obtain a product with a reduced proportion of sugar, which consists in removing at least a portion of the cream, concentrating the remaining milk to about one-fourth of its original volume and at a temperature below the coagulating point of albumen, cooling it to precipitate a portion of the sugar, removing the precipitated sugar and then heating the mass to a temperature above the coagulating point of albumen and below about 210 degrees F. to stiffen and whiten it, and restoring cream to the product.

2. In the treatment of milk to obtain a product with a reduced portion of sugar, concentrating the milk at a temperature below the coagulating point of albumen, separating out only a portion of the sugar, and then heating the mass to a temperature above the coagulating point of albumen to stiffen and whiten it.

3. In the treatment of milk to obtain a product with a reduced portion of sugar, concentrating the milk at a temperature below the coagulating point of albumen, separating out only a portion of the sugar, and then heating it to a temperature above the coagulating point of albumen and below 210 degrees F. to stiffen and whiten it.

4. In the treatment of milk to obtain a product with a reduced portion of sugar, heating the milk and blowing air therethrough until it is concentrated to approximately one-fourth of its original volume, the temperature of the milk being maintained below the coagulating point of albumen, cooling it to precipitate a portion of the sugar, and decanting the milk to separate it from the sugar.

5. In the treatment of milk to obtain a product with a reduced portion of sugar, concentrating the milk at a temperature below the coagulating point of albumen, separating out a portion of the sugar and then heating it to a temperature above the coagulating point of albumen to stiffen and whiten it, and adding cream.

6. In the treatment of milk to obtain a product with a reduced portion of sugar, concentrating the milk at a temperature below the coagulating point of albumen, separating out a portion of the sugar, then heating it to a temperature above the coagulating point of albumen and below about 210 degrees F. to stiffen and whiten it, and adding the cream.

7. The herein-described milk product having a high protein value and the taste of unsweetened cream, having a greater resistance to fermentation than fresh milk, and comprising a mixture of uncoagulated milk solids, enough water to make the consistency approximately that of cream, and a smaller proportion of sugar than in fresh milk.

In witness whereof, we have hereunto signed our names in the presence of two subscribing witnesses.

CHARLES H. CAMPBELL.
PEARL T. CAMPBELL.

Witnesses:
ARTHUR C. FRASER,
THEODORE T. SNELL.